US010666129B2

(12) United States Patent
Okonogi et al.

(10) Patent No.: US 10,666,129 B2
(45) Date of Patent: May 26, 2020

(54) CONTROL CIRCUIT (71) Applicant: HITACHI AUTOMOTIVE SYSTEMS, LTD., Ibaraki (JP)

(72) Inventors: Atsushi Okonogi, Hitachinaka (JP); Takao Fukuda, Hitachinaka (JP); Koichi Tsukio, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/089,129

(22) PCT Filed: Jan. 12, 2017

(86) PCT No.: PCT/JP2017/000704
§ 371 (c)(1),
(2) Date: Sep. 27, 2018

(87) PCT Pub. No.: WO2017/168935
PCT Pub. Date: Oct. 5, 2017

(65) Prior Publication Data
US 2019/0109534 A1  Apr. 11, 2019

(30) Foreign Application Priority Data

Mar. 30, 2016 (JP) ................................ 2016-067037

(51) Int. Cl.
*F02D 41/24* (2006.01)
*F02D 41/00* (2006.01)
(Continued)

(52) U.S. Cl.
CPC .............. *H02M 1/32* (2013.01); *F02D 41/20* (2013.01); *F02D 41/22* (2013.01);
(Continued)

(58) Field of Classification Search
CPC .......... F02D 41/20; F02D 41/22; F02D 41/30; F02D 41/3064; H02M 1/00; H02M 1/08;
(Continued)

(56) References Cited

U.S. PATENT DOCUMENTS

| 5,012,121 | A  | * | 4/1991  | Hammond  | H02J 9/061 307/109 |
| 5,295,038 | A  | * | 3/1994  | Matsushita | F16D 27/112 361/152 |
| 5,998,886 | A  | * | 12/1999 | Hoshino  | H02J 7/345 307/66 |
| 8,541,997 | B2 | * | 9/2013  | Jiang    | H02M 3/33507 323/277 |
| 2009/0159047 | A1 |  | 6/2009  | Eto et al. | |

(Continued)

FOREIGN PATENT DOCUMENTS

| JP | 2003-014552 A | 1/2003 |
| JP | 2005-337038 A | 12/2005 |

(Continued)

OTHER PUBLICATIONS

JP 2005-200208 English Translation Version.*
International Search Report for WO 2017/168935, dated Mar. 28, 2017.

*Primary Examiner* — John Kwon
*Assistant Examiner* — Johnny H Hoang
(74) *Attorney, Agent, or Firm* — Volpe and Koenig, P.C.

(57) ABSTRACT

To protect a switching element to be used in a boost circuit for an in-cylinder injection type internal combustion engine or the like from damage caused by overheating without using a temperature detection element.
In a control circuit that switches a switching element between a conductive state and a non-conductive state, the switching element is controlled or a temperature of the switching element is estimated based on a potential difference between an input terminal and an output terminal of the switching element and a voltage applied to a control terminal of the switching element in the conductive state.

13 Claims, 7 Drawing Sheets

A, B, C ··· FUEL INJECTION SIGNAL (51) Int. Cl.
  *H02M 1/32* (2007.01)
  *F02D 41/20* (2006.01)
  *F02D 41/22* (2006.01)
  *H02M 3/155* (2006.01)
  *H02M 1/00* (2006.01)
  *F02D 41/30* (2006.01)
  *H02M 1/08* (2006.01)
  *H02M 3/156* (2006.01)

(52) U.S. Cl.
  CPC .......... *F02D 41/3064* (2013.01); *H02M 1/00* (2013.01); *H02M 1/08* (2013.01); *H02M 3/155* (2013.01); *H02M 3/156* (2013.01); *F02D 2041/201* (2013.01); *F02D 2041/2006* (2013.01); *F02D 2041/2048* (2013.01); *H02M 2001/0009* (2013.01); *H02M 2001/327* (2013.01); *Y02T 10/40* (2013.01)

(58) Field of Classification Search
  CPC .......... H02M 1/32; H02M 3/15; H02M 3/155; H02M 3/156
  USPC .................................................. 123/470–481
  See application file for complete search history.

(56) References Cited

U.S. PATENT DOCUMENTS

| | | | |
|---|---|---|---|
| 2011/0220067 A1 | 9/2011 | Okonogi et al. | |
| 2013/0021702 A1* | 1/2013 | Waltman .................. | H02H 3/24 361/91.1 |
| 2013/0112172 A1* | 5/2013 | Toyohara ............... | F02D 41/345 123/478 |
| 2015/0311796 A1* | 10/2015 | Dubois ................... | H02M 1/08 323/271 |
| 2016/0076498 A1* | 3/2016 | Aono ................... | F02M 51/061 123/490 |
| 2016/0111236 A1* | 4/2016 | Jin ......................... | G05F 1/569 323/276 |
| 2017/0138289 A1 | 5/2017 | Okonogi et al. | |

FOREIGN PATENT DOCUMENTS

| | | |
|---|---|---|
| JP | 2009-156082 A | 7/2009 |
| JP | 2009-168527 A | 7/2009 |
| JP | 2011-185157 A | 9/2011 |
| JP | 2013-258857 A | 12/2013 |
| JP | 2015-200208 A | 11/2015 |
| WO | 2015/174310 A1 | 11/2015 |

* cited by examiner

FIG. 1

A, B, C ··· FUEL INJECTION SIGNAL

RELATIONSHIP BETWEEN TEMPERATURE AND ON-VOLTAGE OF BOOST FET

FIG. 7

CONTROL CIRCUIT

TECHNICAL FIELD

The present invention relates to a control circuit, and more particularly to a control circuit that switches a switching element between a conductive state and a non-conductive state.

BACKGROUND ART

A boost circuit, which generates a boosted voltage for driving an electromagnetic fuel injection valve of an internal combustion engine, has been known. PTL 1 discloses a technique of protecting an FET from damage caused by overheating by detecting a temperature of the FET, configured to generate a boosted voltage using a thermistor.

CITATION LIST

Patent Literature

PTL 1: JP 2005-337038 A

SUMMARY OF INVENTION

Technical Problem

In the technique described in PTL 1, there are problems that a size of an electronic device increases due to mounting of the thermistor and cost increases.

The present invention has been made in view of the above-described problems, and an object thereof is to protect a switching element to be used in a boost circuit or the like from damage caused by overheating without using a temperature detection element.

Solution to Problem

In order to solve the above-described problems, a control circuit of the present invention is a control circuit that switches a switching element between a conductive state and a non-conductive state, the control circuit controlling the switching element or estimating temperature of the switching element based on a potential difference between an input terminal and an output terminal of the switching element and a voltage applied to a control terminal of the switching element in the conductive state.

Advantageous Effects of Invention

According to the present invention, the switching element is controlled or the temperature is estimated based on the potential difference between the input and output terminals of the switching element and the voltage applied to the control terminal, which are correlated to the temperature of the switching element. As a result, it is possible to control the temperature of the switching element or grasp a temperature abnormality of switching element without using the temperature detection element, and eventually, it is possible to protect the switching element from damage caused by overheating.

DESCRIPTION OF EMBODIMENTS

An embodiment of the present invention will be described in detail below with reference to the drawings.

Figure 1:
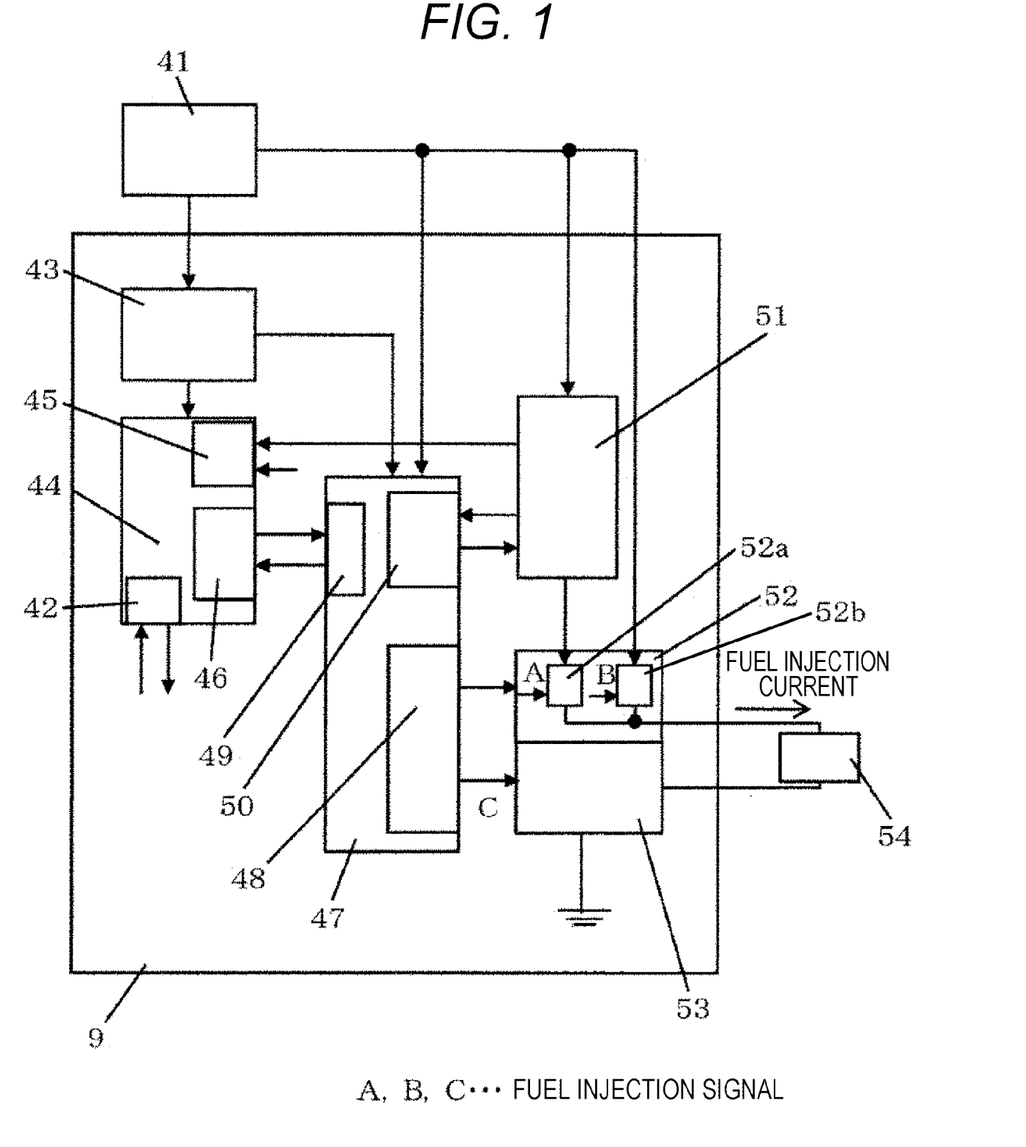
FIG. 1 is a block diagram of an engine control unit.

First, a circuit block diagram of an engine control unit 9 that controls an in-cylinder injection type internal combustion engine (not illustrated) will be illustrated with reference to FIG. 1.

A driver IC 47 (or a pre-driver), a high-side driver 52, and a low-side driver 53, configured to drive a coil load 54 of a fuel injection device, are generally built in the engine control unit 9, but may be provided separately from the engine control unit 9.

The in-cylinder injection type internal combustion engine includes a plurality of cylinders, and includes the fuel injection device for each cylinder. Thus, there is a plurality of high-side drivers and low-side drivers corresponding to the plurality of coil loads 54, but are not illustrated for the sake of simplicity of description.

A battery 41 is an in-vehicle battery mounted on a vehicle. A voltage of the battery 41 is supplied to the engine control unit 9, and this voltage is supplied to a power supply IC 43, the driver IC 47, a boost circuit 51 for driving the fuel injection device, the high-side driver 52, and the like. In addition, the voltage of the battery 41 is also supplied to other in-vehicle devices, and the voltage of the battery 41 fluctuates depending on operation states of the other in-vehicle devices. For example, when a starter motor for cranking the internal combustion engine is energized at the time of starting the internal combustion engine, the voltage of the battery 41 largely drops. In addition, when there is a system that converts kinetic energy of the vehicle into electric energy at the time of deceleration of the vehicle and regenerates the electric energy in the battery 41, the voltage of the battery 41 increases during the regeneration. In a system where automatic restart from an idling stop state or the regeneration frequently occurs, the fluctuation of the battery voltage becomes more prominent.

In addition, the power supply IC 43 lowers the voltage of the battery 41 and supplies a predetermined voltage to a microcomputer 44, the driver IC 47, and the like.

The driver IC 47 includes a communication unit 49 with respect to the microcomputer 44, a boost circuit drive unit 50, and a driver drive unit 48. A switching signal is sent from the boost circuit drive unit 50 to the boost circuit 51, and the boost circuit 51 boosts the voltage of the battery 41 and supplies the boosted voltage to the high-side driver 52.

In addition, the voltage boosted by the boost circuit 51 is fed back to the boost circuit drive unit 50, and the driver IC 47 determines whether to send the switching signal to the boost circuit 51 again.

In addition, the voltage boosted by the boost circuit 51 can also be fed back to an A/D converter 45 of the microcomputer 44, and a signal can be sent to the driver IC 47 from the communication unit 46 in the microcomputer 44 based on an A/D value.

In addition, the A/D converter of the microcomputer 44 can input and monitor signals from a fuel pressure sensor, a temperature sensor, and the like other than the boosted voltage. The microcomputer 44 also has an input/output port 42 for driving an external load and monitoring signals from the outside.

The high-side driver 52 can obtain power supply based on the boost circuit 51 and the battery 41, and has a driver 52a driven by the boosted voltage and a driver 52b driven by the battery voltage.

The driver drive unit 48 serves a role of causing a current to flow to the coil load 54 according to drive signals (A and B). The low-side driver 53 serves a role of causing a current from the coil load 54 to flow to a ground potential according to a drive signal (C) from the driver drive unit 48.

In addition, a current detection function and a terminal voltage detection function using a shunt resistor or the like are provided in any one of or both the high-side driver 52 and the low-side driver 53, and the driver is driven by detecting a current value flowing in the driver and the coil load 54 and feeding back the current value.

In addition, it is also possible to detect overcurrent to the driver, a power supply fault of a terminal, and a ground fault with these functions.

Here, the boost circuit 51, the high-side driver 52, and the low-side driver 53 may be provided either inside or outside the driver IC 47, and the driver IC 47 may be used as either the driver or the pre-driver.

In addition, the boost circuit 51 may generate the boosted voltage to be supplied to the fuel injection devices of all the cylinders, and the number of boost circuits can be appropriately designed in accordance with the number of cylinders, for example, by providing two boost circuits for a six-cylinder engine such that three cylinders share one boost circuit.

Figure 2:
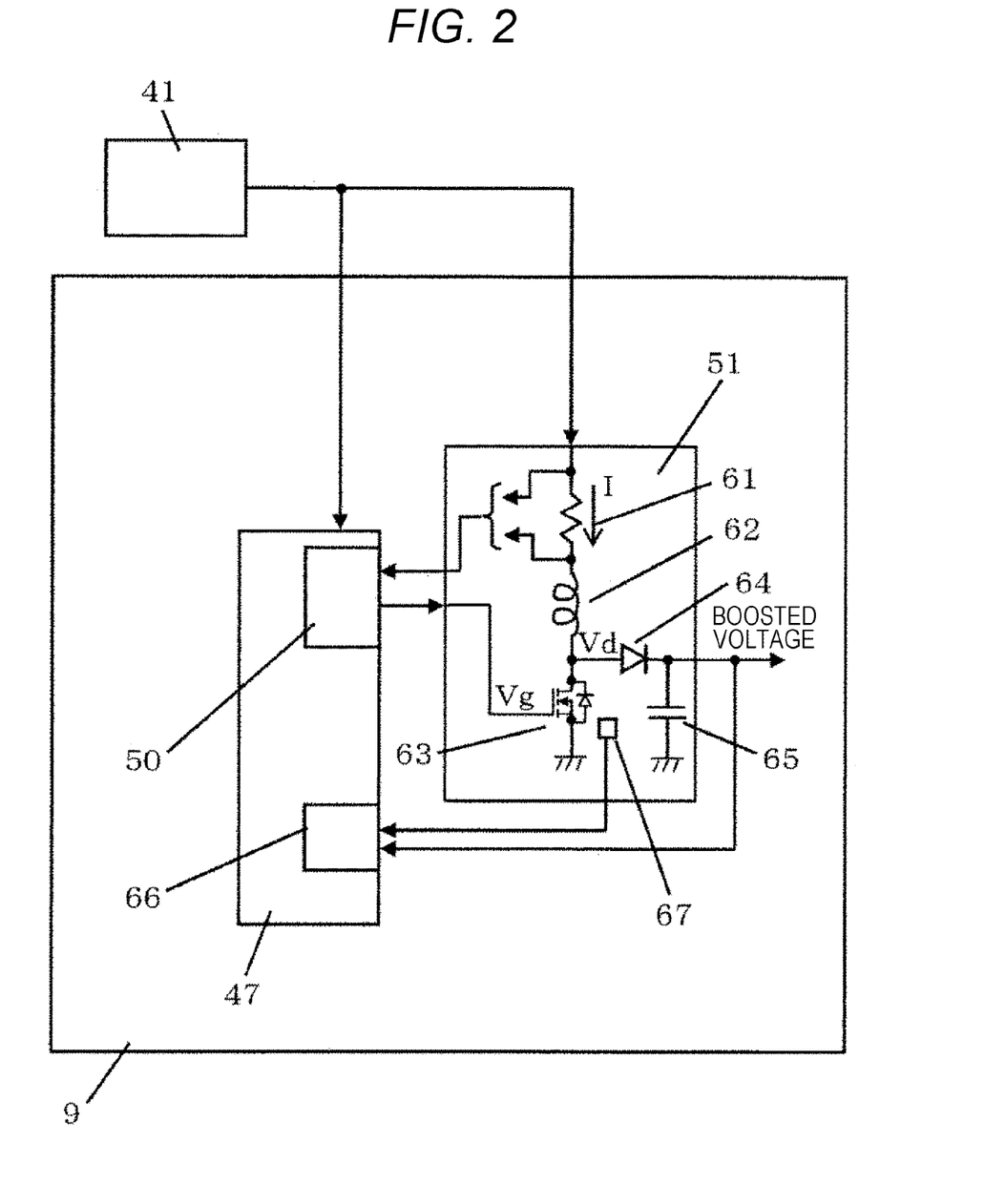
FIG. 2 is a block diagram of a boost circuit.

FIG. 2 is a diagram for describing details of the boost circuit 51. When a gate voltage Vg of a boost FET 63 is turned on, a current I flows from the battery 41 to a GND via the shunt resistor 61, the boost coil 62, and a boost FET 63. The current at this time is detected as a voltage across the shunt resistor 61 by the boost circuit drive unit 50, and the boost FET 63 is turned off when a set maximum current value is detected. At that time, the current I flows to a boost diode 64 by a counter electromotive force of the boost coil 62. A boost capacitor 65 serves a role of temporarily storing energizing energy of the boost coil 62 via a diode.

Next, the boost FET 63 is turned on again when the current flowing in the shunt resistor 61 decreases, and the current value increases. The current is caused to continuously flow to the boost diode 64 by repeating the above-described operation, and the energizing energy of the boost coil 62 is stored in the boost capacitor 65, thereby generating the boosted voltage.

In addition, a voltage monitoring circuit 66 is provided to monitor the boosted voltage in order to perform boosting when the voltage is low and to stop boosting when the voltage reaches a predetermined value.

In addition, a thermistor 67 is installed in the boost circuit 51 in order to protect the boost FET 63 from overheating, and a temperature of the boost FET 63 is monitored by inputting a voltage of the thermistor 67 in the voltage monitoring circuit 66.

Here, the voltage monitoring circuit 66 may be provided either inside or outside the driver IC 47.

Figure 3:
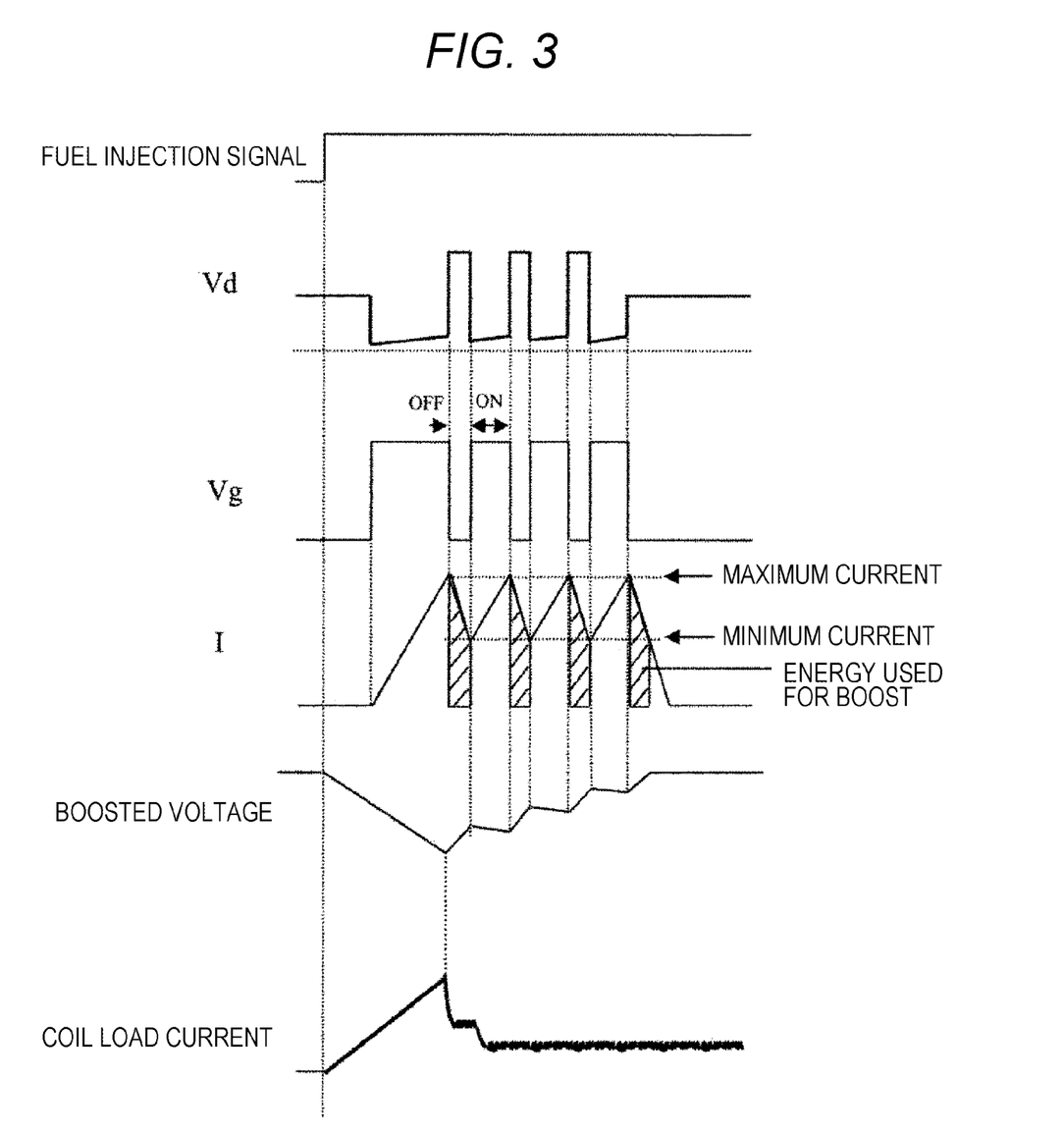
FIG. 3 is voltage and current waveforms of boosted voltage generation.

Next, waveforms of the boosting operation are illustrated in FIG. 3. When a gate signal for turning on the boost FET 63 is Vg and is turned on, a drain voltage Vd of the boost FET 63 decreases to around 0V, and the current I increases. When the current I reaches a set maximum current, the gate signal Vg of the boost FET 63 is turned off.

At that time, Vd reaches a value corresponding to the boosted voltage, the current I flows to the boost diode 64 side and is stored in the boost capacitor 65, but the current value itself decreases with time. The boost FET 63 is turned on again when the current value reaches a set minimum current, and thus, the boosting operation illustrated in FIG. 3 is performed such that the current falls within a predetermined range by repeating the above-described operation. This operation is performed until the boosted voltage reaches a set value.

Incidentally, the hatched portion in the drawing represents electric energy that is actually stored in the boost capacitor 65 via the boost diode 64 and is a current to be used for boosting. When this operation is performed, voltage and current waveforms at the time of generating the boosted voltage are obtained as the waveforms illustrated in FIG. 3.

Since an electromagnetic fuel-driven valve of the internal combustion engine is driven to open, when the energization to the coil load 54 is started, the boosted voltage decreases until a current of the coil load 54 reaches a maximum value (peak current value). This is because the most electromagnetic force is required at the time of opening the fuel injection valve, so that the driver 52a is turned on and the voltage of the boost capacitor 65 is used until the current of the coil load 54 reaches the peak current. After completing the opening of the fuel injection valve, it is sufficient to maintain a valve-opening state with the voltage of the battery 41 via the driver 52b. Therefore, the driver 52a is turned off and the boosted voltage is not used after reaching the peak current, and thus, the boosted voltage is gradually recovered by switching drive of the boost circuit.

The boosted voltage increases since the current flows in the boost capacitor when Vg is turned off, and the boosted voltage does not increase since no current flows to the boost capacitor (slightly decreases due to natural discharge) when Vg is turned on. As the above-described operation is repeated, the boosting by switching of Vg is performed until the boosted voltage becomes the predetermined value.

Incidentally, a timing to turn off the driver 52a may be determined by detecting that the current of the coil load 54 reaches a predetermined value, or may be determined by detecting that a period during which the driver 52a is turned on has reached a predetermined time.

Incidentally, the waveform of the boosting operation corresponding to one-time injection of one fuel injection valve has been described in FIG. 3 for the sake of simplicity of description, but invention is not limited thereto. In general, the internal combustion engine is provided with a plurality of fuel injection valves for each cylinder, and a boosted voltage to be supplied to the plurality of fuel injection valves is generated by one boost circuit. In particular, when the fuel injection valve is provided in the cylinder and a multi-stage injection of injecting fuel a plurality of times during one combustion cycle is performed, the use of the boosted voltage starts before the boosted voltage returns to a predetermined value, and periods of supplying the boosted voltage to the plurality of fuel injection valves overlap each other, which results in a more complicated waveform.

Figure 4:
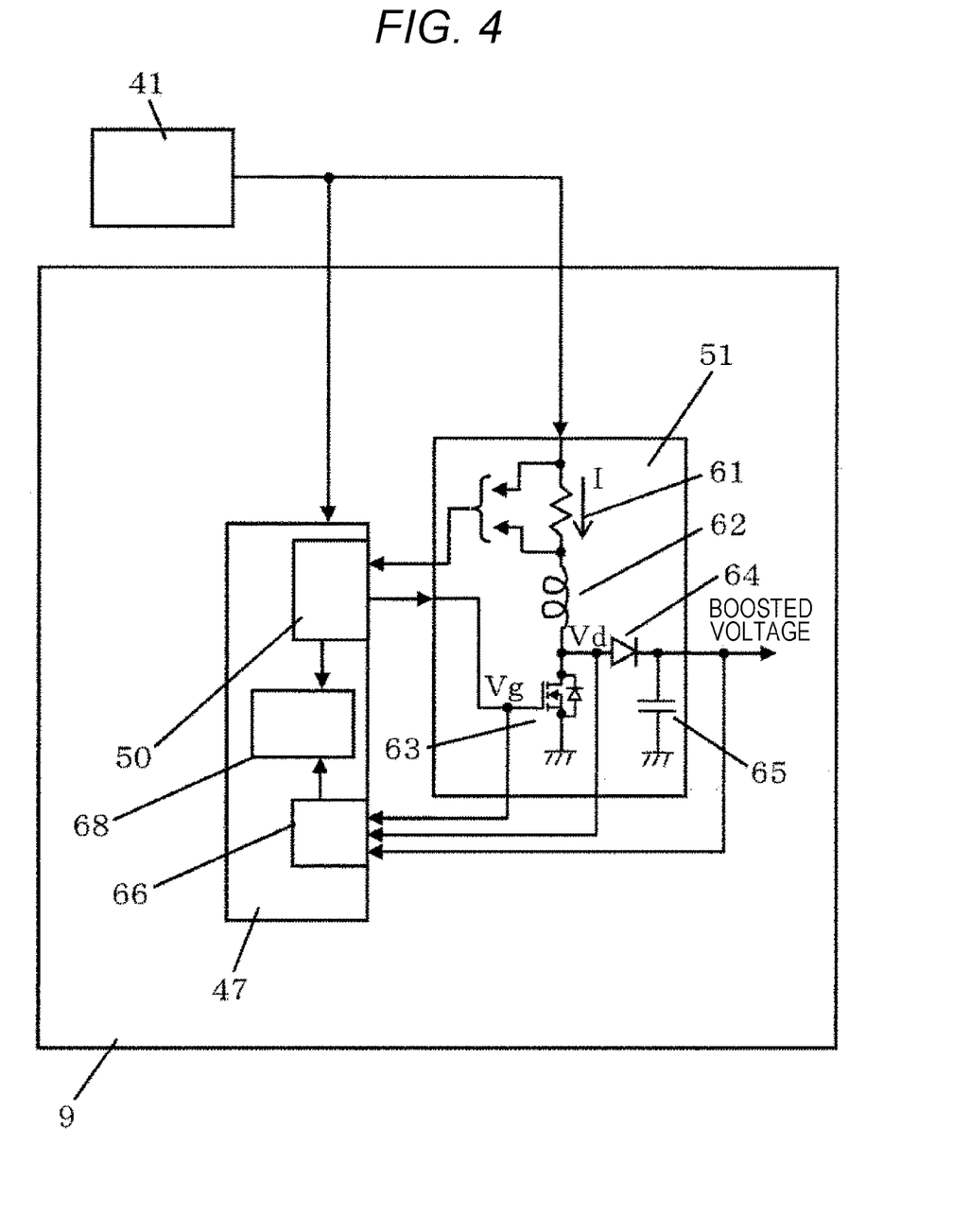
FIG. 4 is a block diagram of a boost circuit of the present embodiment.
Figure 5:
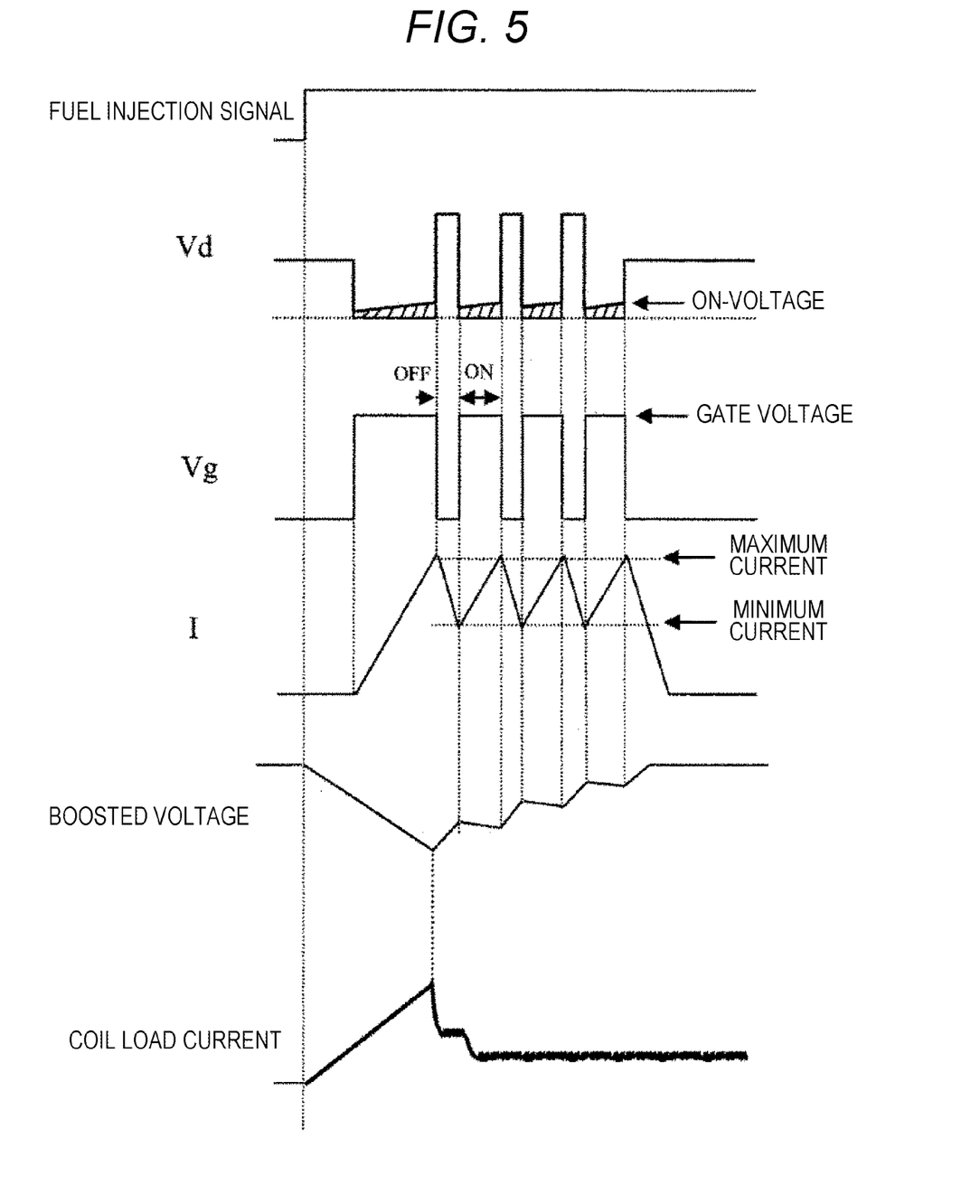
FIG. 5 is voltage and current waveforms of boosted voltage generation in the present invention.

FIGS. 4 and 5 are drawings for describing the embodiment relating to characteristic parts of the present invention. In FIG. 4, the thermistor is eliminated from the circuit of FIG. 2, the gate voltage Vg and the on-voltage Vd of the boost FET 63 are input to the voltage monitor 66 instead, and a determination unit 68 for a read voltage is provided.

Here, since the gate voltage Vg is generated using the voltage of the battery 41, the voltage of the battery 41 may be acquired by another method and regarded as the gate voltage Vg.

When the gate voltage Vg is generated using a predetermined voltage supplied by the power supply IC 43, predetermined voltage may be regarded as the gate voltage Vg.

In addition, the on-voltage Vd means a potential difference between a drain and a source of the boost FET 63. Since it is regarded that a potential difference between a drain terminal of the boost FET 63 and the GND is equal to the on-voltage Vd, a signal is input from the drain terminal to the voltage monitor 66 to monitor the on-voltage Vd.

In addition, the control terminal, the input terminal, and the output terminal described in the solution to problem correspond to a gate terminal, a drain terminal, and a source terminal of the boost FET 63, respectively.

The determination unit 68 is provided inside or outside (in the microcomputer 44 or the like) the driver IC 47. The temperature of the boost FET 63 is calculated by monitoring the gate voltage Vg and the on-voltage Vd (the hatched portion in FIG. 5) when the boost FET 63 is turned on.

Here, parameters to determine the on-voltage Vd of the boost FET 63 are the gate voltage Vg, a drain-source current when the FET is turned on, and the temperature of the boost FET 63. That is, the on-voltage Vd, the gate voltage Vg, the drain-source current, and the temperature have a correlation.

Specifically, the temperature of the boost FET 63 exponentially increases as the drain-source current increases.

In addition, the on-voltage Vd proportionally increases as the temperature of the boost FET 63 rises. This is because the on-resistance of the boost FET 63 changes depending on the temperature characteristic of the boost FET 63.

In addition, the gate voltage Vg and the on-voltage Vd are inversely proportional to each other.

Here, the current I is controlled so as to fall within the predetermined range as described with reference to FIG. 3, in the boost circuit of the fuel injection device which is one example of the present invention. That is, since a value of the drain-source current can be regarded as a set value (known), the temperature of the boost FET 63 can be calculated if the gate voltage Vg and the on-voltage Vd can be monitored.

Here, when the gate voltage Vg is generated using the voltage supplied from the battery 41 to the driver IC as described with FIG. 4, it is particularly important to monitor the gate voltage Vg.

Incidentally, the value of the on-voltage Vd is very small, and thus, is sometimes hardly detected depending on a fluctuation situation of the gate voltage Vg. Therefore, the setting range of the current I in FIG. 5 may be changed to vary the drain-source current in accordance with the voltage of the battery 41.

Incidentally, the temperature calculation is not necessarily performed during a period in which the current I is not within the predetermined range (such as a period in which the current I is increased for the first time after starting the boosting operation) even when the boost FET 63 is turned on since the drain-source current value is outside a set value (which is known). For example, it is sufficient to detect that the current I reaches the maximum current value or the minimum current value for the first time after starting the boosting operation, that the boost FET 63 is turned off for the first time after starting the boosting operation, or the like.

Figure 6:
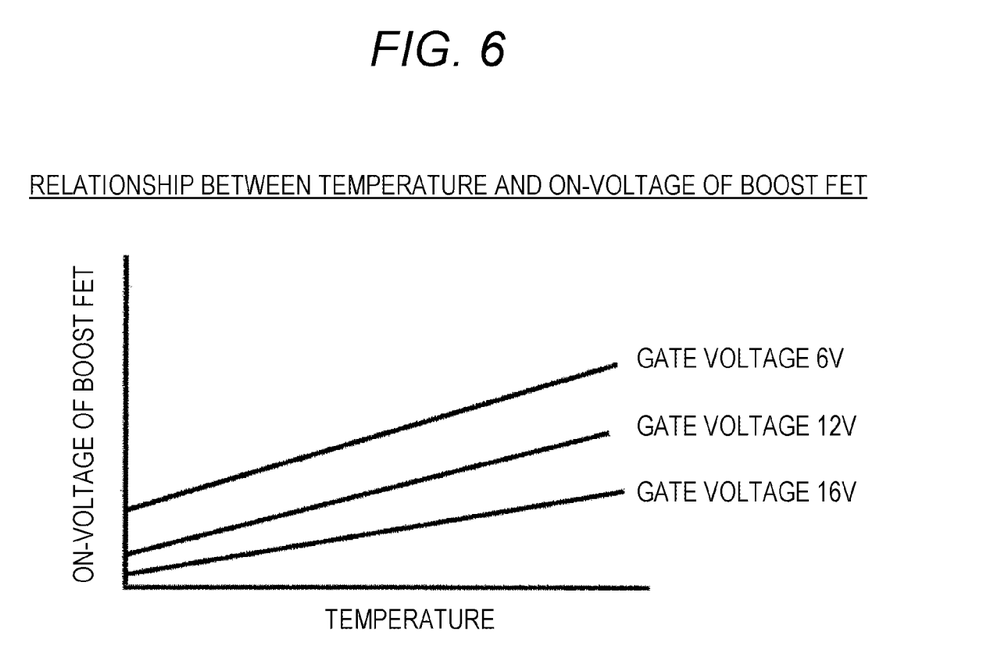
FIG. 6 is an explanatory view of a correlation between a temperature of a boost FET and an on-voltage.

FIG. 6 illustrates a relationship between the on-voltage Vd of the boost FET 63 and the gate voltage Vg, with respect to the temperature of the boost FET 63 when the drain-source current is known. The on-voltage decreases as the gate voltage is higher, and the on-voltage increases as the temperature is higher in this relationship. As this relationship is stored as a table, the temperature can be calculated.

Incidentally, the table search for the temperature may be performed using a value obtained by detecting the drain-to-source current using the shunt resistor 61, but an operational load of calculation and the capacity of the table increase, and thus, it is desirable to make the drain-source current known. Even when the table search for the temperature is performed using a detection value of the drain-source current, the shunt resistor 61, provided in the boost circuit 51 for another application, can be also used for the temperature calculation, so that it is possible to realize downsizing of the boost circuit 51.

Incidentally, the table may be stored in either storage device of the driver IC 47 and the microcomputer 44. Incidentally, standard values of characteristics of the boost FET 63 may be used for calculation of the table, but tables different for each unit may be input using individual characteristic data of components of the boost FET 63.

In addition, the temperature may be calculated by predetermined calculation using the microcomputer 44, instead of the table search. Even in this case, it is desirable to make the drain-source current known in order to reduce the operational load of the microcomputer 44.

Figure 7:
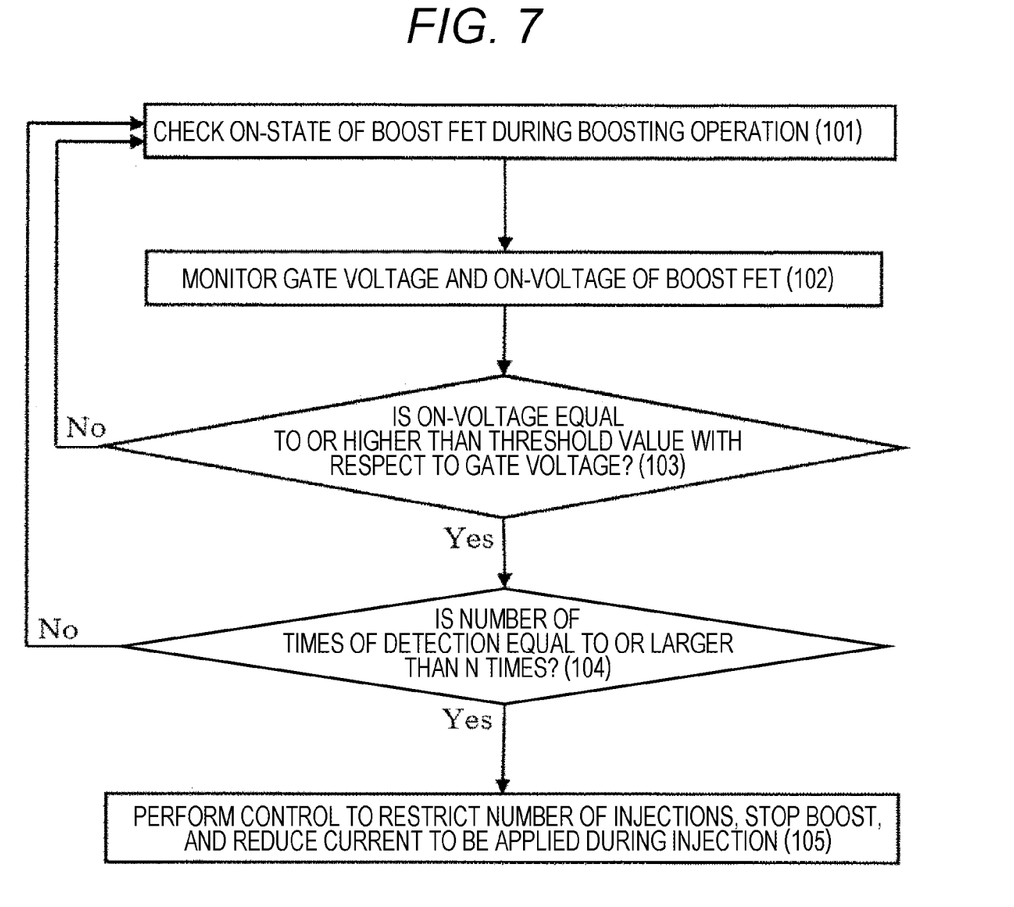
FIG. 7 is a flowchart of overheat protection control.

FIG. 7 is a view illustrating a control flowchart of a process executed by the microcomputer 44 or a process executed by the driver IC.

First, it is necessary to turn on the boost FET 63 (101), and at this time, the gate voltage Vg and the on-voltage Vd of the boost FET 63 are monitored by the voltage monitoring circuit 66 (102).

Then, the determination unit 68 checks whether the on-voltage Vd is equal to or higher than a threshold value with respect to the gate voltage Vg (103), and the microcomputer 44 performs control to reduce the number of fuel injections during one combustion cycle, to stop generation of the boosted voltage, to stop supply of the boosted voltage, to reduce a maximum value of an energizing current of the coil load 54 of the fuel injection valve, and to restrict rotational speed of internal combustion engine when the on-voltage exceeds threshold value (105). It is possible to perform control to reduce an on-time of the boost FET 63 either directly with the above-described processes or indirectly by reducing the frequency of supplying the boosted voltage. Then, it is possible to protect the boost FET 63 from damage caused by overheating without using the thermistor 67 as illustrated in FIG. 2. In addition, it is also possible to prevent overheating of other elements of the boost circuit 51 by preventing the overheating of the boost FET 63.

Incidentally, a driver may be urged to restrict an operating range of the internal combustion engine or to receive repair from a mechanic by notifying the driver of an abnormal state, instead of overheat damage protection control (105). These also make it possible to resolve an overheating state of the boost FET 63 or to prevent further damage. In addition, a temperature calculation value of the boost FET 63 may be recorded as an abnormal value.

Incidentally, it is possible to perform diagnosis with high accuracy by setting the number of times of detection (104) before performing the overheat damage protection control (105) in order for prevention of erroneous diagnosis.

In addition, although the on-voltage Vd with respect to the gate voltage Vg is calculated as the temperature of the boost FET 63 in FIG. 7, temperature information on an engine water temperature, other temperature detection elements, and the like are used together to further improve the accuracy.

In addition, the threshold value of the abnormality determination process 103 in FIG. 7 may be changed for each unit in accordance with a heat resistance limit of each component of the boost FET 63 as well as the table illustrated in FIG. 6 may be calibrated based on characteristic data of each component of the boost FET 63.

Incidentally, the embodiment in which the thermistor 67 is eliminated has been described in FIG. 4, the thermistor 67 may be left to calculate temperature information redundantly using a table of FIG. 6. At this time, it is possible to directly detect the temperature information of the boost FET 63 itself, or the boost circuit 51, the driver IC 47, and the engine control unit 9 itself using the thermistor 67. Further, a detected value of the thermistor 7 and a calculated value using the table of FIG. 6 may be compared to determine at least one of these values as an abnormality or to correct one of these values.

In addition, when the number of cylinders of the internal combustion engine is large and a plurality of boost circuits are provided, the thermistor 67 may be provided in some boost circuits, and no thermistor may be provided in the other boost circuits. As a result, it is possible to reduce the size and cost as the entire boost circuit.

At this time, piston reciprocating speed for each cylinder, an output torque, the number of injections during one combustion cycle, and the like are common in many cases, and thus, temperatures of the boost FETs provided for the respective boost circuits have a certain correlation. Therefore, even in such a case, the temperature information may be calculated using the table of FIG. 6 in the boost circuit that is not provided with the thermistor 67, a detected value of the thermistor 67 and a calculated value using the table of FIG. 6 may be compared to determine at least one of these values as an abnormality or to correct one of these values. When there are three or more detected values of the thermistor or calculated values using the table, it is also possible to specify an abnormal value by majority vote.

Although the embodiment of the present invention has been described by exemplifying the boost circuit for the fuel injection valve of the internal combustion engine, the invention is not limited thereto. For example, the present invention can be applied for temperature calculation of a switching element used in a drive circuit of another coil load or temperature calculation of a switching element used in a switching regulator.

When the present invention is applied to a boost circuit for an internal combustion engine that performs a multi-stage injection of injecting fuel a plurality of times during one combustion cycle, a particularly large effect is obtained in terms that the temperature of the boost FET changes greatly depending on an operating state such as rotational speed of the internal combustion engine and the number of fuel injections, and there is a restriction on a mounting space of the boost circuit (and the engine control unit) in an engine room.

REFERENCE SIGNS LIST 9 engine control unit
41 battery
42 input/output port
43 power supply IC
44 microcomputer
45 A/D converter
46 communication unit
47 driver IC
48 driver drive unit
49 communication unit
50 boost circuit drive unit
51 boost circuit
52 high-side driver
53 low-side driver
54 coil load
61 shunt resistor
62 boost coil
63 boost FET
64 boost diode
65 boost capacitor
66 voltage monitoring circuit
67 thermistor
68 determination unit

The invention claimed is:

1. A control circuit, for improving resistance to overheating, comprises:
a boost circuit including
a switching element between a conductive state and a non-conductive state, that boosts an input voltage,
a coil provided in series with an input terminal of the switching element, and
a boost capacitor which is provided in parallel with the switching element and stores energizing energy of the coil as a boosted voltage when the switching element is in the non-conductive state;
a driver IC; and
an in-vehicle battery communicatively coupled to the boost circuit and the driver IC,
wherein the boost circuit calculates an estimated value of a temperature of the switching element based on a potential difference between the input terminal and an output terminal of the switching element and a voltage applied to a control terminal of the switching element in the conductive state,
wherein the boost circuit determines at least one of an output value of a temperature detection element and the estimated value as an abnormality or corrects one of the output value and the estimated value based on the output value and the estimated value
wherein a voltage of the in-vehicle battery is used as the voltage applied to the switching element,
wherein the switching element is an FET, and the control terminal is a gate terminal, and
wherein the control circuit or the boost circuit comprises the temperature detection element that detects a temperature of at least one of the switching element, the boost circuit, and the control circuit.

2. The control circuit according to claim 1, wherein
a boost capacitor which is provided in parallel with the switching element and stores energizing energy of the coil as a boosted voltage when the switching element is in the non-conductive state, and
the control circuit controls the switching element such that a current flowing in the coil falls within a predetermined range.

3. The control circuit according to claim 2, wherein
the boost circuit comprises a current detection circuit provided in series with the coil, and
the control circuit controls the switching element such that a current value detected by the current detection circuit falls within a predetermined range.

4. The control circuit according to claim 2, wherein
a voltage of the in-vehicle battery is used as the voltage applied to the switching element.

5. The control circuit according to claim 1, wherein
the boosted voltage is used for valve-opening drive of an electromagnetic injection valve for an internal combustion engine, and
the control device performs control to reduce a conduction time of the switching element by reducing a time for which the boosted voltage is used for the valve-opening drive based on the potential difference between the input terminal and the output terminal and the voltage applied to the gate terminal in the conductive state.

6. The control circuit according to claim 5, wherein
the internal combustion engine is controlled to inject fuel a plurality of times during one combustion cycle, and
the control device reduces a number of injections during one combustion cycle of the internal combustion engine based on the potential difference between the input terminal and the output terminal and the voltage applied to the gate terminal in the conductive state.

7. The control circuit according to claim 5, wherein
the control device implements at least one of stopping a boosting operation of the boost circuit, stopping use of the boosted voltage for the valve-opening drive, restricting an energizing current of the electromagnetic injection valve, and restricting rotational speed of the internal combustion engine based on the potential difference between the input terminal and the output terminal and the voltage applied to the gate terminal in the conductive state.

8. The control circuit according to claim 1, wherein
the switching element is controlled based on a correlation among the potential difference between the input terminal and the output terminal, the voltage applied to the gate terminal, a current flowing between the input terminal and the output terminal, and a temperature of the switching element in the conductive state.

9. The control circuit according to claim 1, wherein
the temperature of the switching element is estimated based on the potential difference between the input terminal and the output terminal, the voltage applied to the gate terminal, and a current flowing between the input terminal and the output terminal in the conductive state.

10. The A control circuit, for improving resistance to overheating, comprises:
a boost circuit including
a plurality of switching elements, corresponding to a plurality of cylinders, that boost an input voltage,
wherein the boosted voltage is used for valve-opening drive of an electromagnetic injection valve for an internal combustion engine,
a boost capacitor which is provided in parallel with the switching element and stores energizing energy of the coil as a boosted voltage when the switching element is in the non-conductive state;
a driver IC;
an internal combustion engine comprises the plurality of cylinders; and
an in-vehicle battery communicatively coupled to the boost circuit, the driver IC, and the internal combustion engine,
wherein a voltage of the in-vehicle battery is used as the voltage applied to the switching element,
wherein the switching element is an FET, and the control terminal is a gate terminal,
the control circuit or the boost circuit comprises the temperature detection element that detects a temperature of at least one of the switching element, the boost circuit, and the control circuit, and
wherein the control circuit
calculates an estimated value of a temperature of one switching element based on a potential difference between the input terminal and an output terminal of the one switching element and a voltage applied to a control terminal of the one switching element in a conductive state of the one switching element among the plurality of switching elements, and
determines at least one of the estimated value and a temperature detection value or a temperature estimated value of another switching element among the plurality of switching elements as an abnormality or corrects one of the estimated value and the temperature detection value or the temperature estimated value based on the estimated value and the temperature detection value or the temperature estimated value of another switching element among the plurality of switching elements.

11. The control circuit according to claim 1, wherein
the FET is controlled or the temperature of the FET is estimated based on a potential difference between the input terminal and a ground potential.

12. The control circuit according to claim 1, wherein
the control circuit comprises a storage device,
the storage device stores a table in which a plurality of correlations among the potential difference between the input terminal and the output terminal, the voltage applied to the gate terminal, and a temperature of the switching element in the conductive state are recorded, and
the control circuit controls the switching element or estimates the temperature of the switching element based on the table.

13. The control circuit according to claim 1, wherein
the boost circuit comprises a current detection circuit provided in series with the coil, and
the control circuit estimates the temperature of the switching element based on a current value detected by the current detection circuit.

* * * * *